(12) United States Patent
Polizzotti et al.

(10) Patent No.: US 6,742,603 B2
(45) Date of Patent: Jun. 1, 2004

(54) HYDROTHERMAL DRILLING METHOD AND SYSTEM

(75) Inventors: Richard S. Polizzotti, Milford, NJ (US); Lee Hirsch, Evanton, IL (US); Amy B. Herhold, Short Hills, NJ (US); Mehmet D. Ertas, Hillsborough, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 10/164,872

(22) Filed: Jun. 7, 2002

(65) Prior Publication Data

US 2003/0121701 A1 Jul. 3, 2003

Related U.S. Application Data

(60) Provisional application No. 60/298,981, filed on Jun. 18, 2001.

(51) Int. Cl.[7] .......................... E21B 7/18; E21C 37/12
(52) U.S. Cl. ........................ 175/17; 175/65; 299/17
(58) Field of Search ...................... 175/11–17, 2, 175/424, 65, 67; 299/17

(56) References Cited

U.S. PATENT DOCUMENTS

| | | | | |
|---|---|---|---|---|
| 2,258,001 A | | 10/1941 | Chamberlain ................... 225/1 |
| 2,833,516 A | * | 5/1958 | Salomonsson ................ 175/12 |
| 3,112,800 A | * | 12/1963 | Bobo ......................... 175/424 |
| 3,467,206 A | | 9/1969 | Acheson et al. ............... 175/13 |
| 4,085,799 A | | 4/1978 | Bousaid et al. .............. 166/272 |
| 4,190,121 A | * | 2/1980 | Baum et al. ................... 175/14 |
| 4,212,353 A | * | 7/1980 | Hall ............................. 299/17 |
| 4,431,069 A | * | 2/1984 | Dickinson et al. ............. 175/61 |
| 5,176,210 A | | 1/1993 | Gammon ....................... 175/18 |
| 5,232,627 A | | 8/1993 | Burba et al. ................. 507/140 |
| 5,735,355 A | | 4/1998 | Bussod et al. ................ 175/16 |
| 5,771,984 A | | 6/1998 | Potter et al. ................... 175/14 |
| 5,853,056 A | * | 12/1998 | Landers ....................... 175/424 |
| 5,964,303 A | | 10/1999 | Plichta ......................... 175/14 |
| 6,152,356 A | * | 11/2000 | Minden ........................ 299/17 |
| 6,460,632 B1 | * | 10/2002 | Chatterji et al. ............... 175/66 |
| 2003/0029617 A1 | * | 2/2003 | Brown et al. .................. 299/17 |

FOREIGN PATENT DOCUMENTS

| | | | |
|---|---|---|---|
| FR | 2483509 | 12/1981 | |
| WO | 9325799 | 12/1993 | ............ E21B/43/10 |
| WO | 9603566 A2 | 2/1996 | ............. E21B/7/14 |
| WO | 9935368 | 7/1999 | ............ E21B/43/10 |

OTHER PUBLICATIONS

American Journal of Science, Patricia M. Dove, The Dissolution Kinetics of Quartz in Sodium Chloride Solutions at 25° To 300°C, p. 665–712, Georgia Institute of Technology, Atlanta, Georgia, Jun. 1994.

(List continued on next page.)

Primary Examiner—David Bagnell
Assistant Examiner—Matthew J Smith
(74) Attorney, Agent, or Firm—Ramesh Varadaraj; Paul E. Purwin

(57) ABSTRACT

A method and system is disclosed for extending the depth of a subterranean borehole that uses heated aqueous fluid to dissolve rock of the subterranean formation. The heated aqueous fluid comprises water and hydroxides of Group I elements of The Periodic Table of Elements and mixtures thereof. The drilling system comprises means for delivering aqueous fluid and heating the aqueous fluid prior to contacting rock of a subsurface formation.

20 Claims, 3 Drawing Sheets

OTHER PUBLICATIONS

Russian Journal of Inorganic Chemistry, M. A. Urusova, Phase Equilibria in the Sodium Hydroxide–Water and Sodium Chloride–Water Systems At 350–550°C, P.450–454, vol. 19, 1974.

Journal of Canadian Petroleum Technology, J. North, S. T. Knibb, S. M. Farouq Ali, The Hydrathrem Hybrid Drilliing Systems for Cheaper Heavy Oil Recovery, May 2001, vol. 40, No. 5, p. 67–74,.

Ledgerwood, L. W.: "Efforts to Develop Improved Oilwell Drilling Methods" Journal of Petroleum Technology, AIME, Dallas, Texas, US. vol. 219, Apr. 1, 1960, pp. 61–74, XP000614501.

* cited by examiner

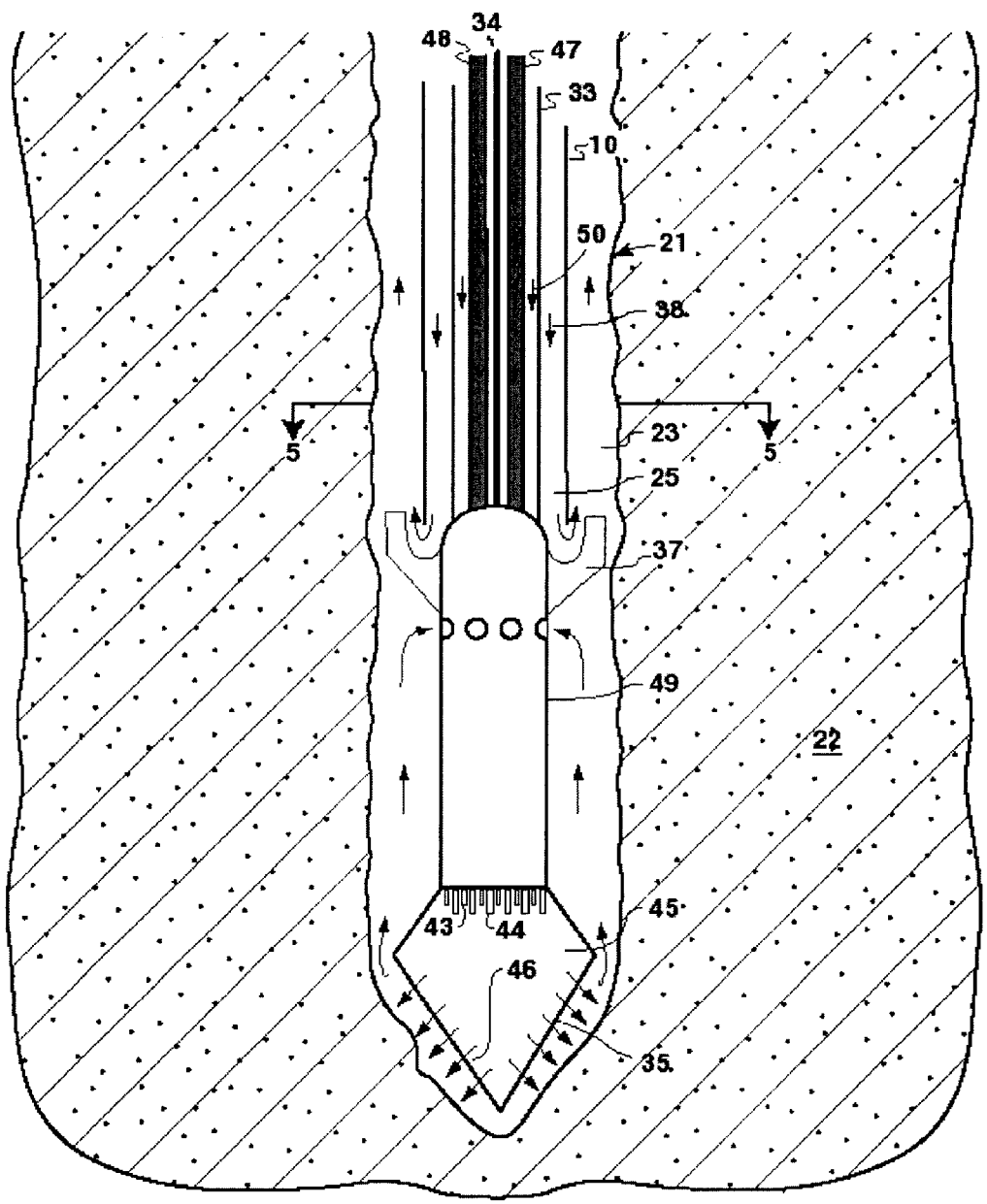
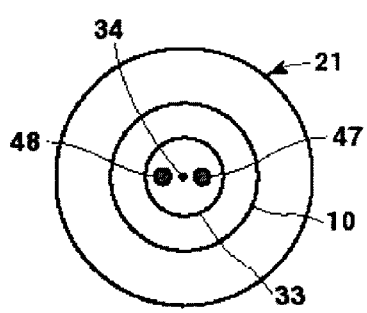
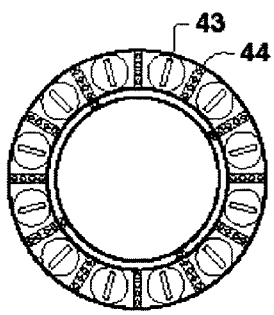

HYDROTHERMAL DRILLING METHOD AND SYSTEM

REFERENCE TO RELATED APPLICATIONS

This application claims the benefit of U.S. Provisional Patent Application No. 60/298,981 filed on Jun. 18, 2001.

FIELD OF THE INVENTION

This invention relates generally to a method and system for drilling into and through subsurface rock using high temperature aqueous solutions comprising high concentrations of hydroxyl ions.

BACKGROUND OF THE INVENTION

For many years, oil and gas wells have been drilled by a rotary bit mounted on a tubular drill string extending down a borehole from the surface of the earth. The drill string is rotated at the surface, and the rotary motion is transmitted by the drill string to the bit at the bottom of the hole. A liquid commonly known as drilling mud is introduced through the drill string to cool the bit and to carry cuttings produced by the bit to the surface through the annular space between the drill string and the wall of the borehole. This method of drilling has certain limitations and advantages. The string must be relatively stiff in order to transmit torque and heavy enough to transmit sufficient axial load to the bit at the bottom of the hole. In hard rock, the drilling rate is slow, and the drill bit tends to wear rapidly. When the drill bit requires replacement, the entire string must be pulled out of the hole and broken down into tubing joints as it is removed. It is necessary to use heavy, powerful machinery to handle the relatively heavy drill string. Powerful equipment is also required in order to inject the drilling mud with sufficient pressure to remove cuttings from the bottom of the well. In horizontal drilling, removal of the cuttings by the flowing mud is particularly difficult because the axial mudflow is perpendicular to the settling direction. In the case of horizontal drilling, the weight of the drill collar can no longer be used effectively to provide the required weight on the drill bit. The horizontal distance that can be drilled becomes limited by cutting removal and by buckling of the drill string in compression unless a complex bottom hole tractor is used.

To overcome the shortcoming of rotary drilling, various means have been proposed of directing high velocity streams or jets of fluid against the material to be cut. In one approach, high-pressure fluid is discharged from the distal end of a hollow drilling tube. Hydraulic jet drill heads are typically attached to the drilling tube, with the drill heads having a multiplicity of nozzles through which the drilling fluid is discharged. Because of the difficulties in compressing fluid to very high pressures, in transporting the pressurized fluid over a long distance, and with erosion of equipment due to high velocity solids-laden fluid, the fluid jet approach of drilling boreholes has seen limited usage.

Thermal spallation is another method to drill holes through rock. Spallation, often called thermal drilling, produces thin flakes, or spalls, that flake or spall off the rock surface. In one spallation procedure, a combustion flame jet impinges on a rock surface, thereby inducing stresses high enough to cause the rock to spall. Examples of spallation drilling are disclosed in U.S. Pat. No. 5,771,984 and WO9603566. Spallation drilling has the advantage in that a drilling rig need not use rotation of the drill string. Further, there is no direct contact between the effective end of the drilling apparatus and the rock being removed, thereby avoiding wear caused by abrasion at the tool-rock interface. However, one shortcoming of spallation drilling is the difficulty of avoiding overheating of at least part of the rock to be spalled. Some types of rock will not spall if the heat flux exceeds a minimum temperature. Overheating of the rock can result in fusion of specific mineral components at the thermodynamic melting point severely impeding the spallation process. Molten rock is more resistant to spalling after resolidification and cannot easily be removed by a spallation apparatus as disclosed in U.S. Pat. No. 3,467,206.

A hybrid drilling system, wherein spallation drilling using a flame jet is combined with mechanical cutting and erosion using ultra-high pressure hydrojets, is disclosed by J. North, S. T. Knibb, and S. M. Farouq Ali in the Journal of Canadian Petroleum Technology, Volume 40, P 67, 2001. In one example of this technique, 0.075% ethanoic acid is added to the water to enhance the drilling process for limestone.

Chemical dissolution of rock using jets is yet another disclosed method to drill holes through rock as disclosed in U.S. Pat. No. 2,258,001, U.S. Pat. No. 5,964,303 and W. C. Mauer, "Advanced Drilling Techniques", Petroleum Publishing Co., 1980. The disadvantages of the chemical approaches proposed to date are the highly toxic and corrosive nature of the chemical agents, the extreme high temperatures required and the high expense of the chemical agents.

A need therefore exists for an improved drilling system that can effectively penetrate deep, subsurface rock formations.

SUMMARY OF THE INVENTION

The invention includes a method for penetrating rock of a subsurface formation, comprising:

(a) lowering a fluid conduit into a borehole in the subsurface formation, the conduit having a top end and a lower end and adapted to heat and discharge from the lower end a stream of aqueous fluid;

(b) introducing into the top end of the fluid conduit an aqueous fluid comprising water and hydroxides of Group I elements of The Periodic Table of Elements and mixtures thereof;

c) heating said aqueous fluid to temperatures in the range of 500° C. to 1400° C. to provide a heated aqueous fluid;

d) discharging from the lower end of the fluid conduit the heated aqueous fluid to contact the rock of the subsurface formation and effect dissolution of the rock therefrom; and e) removing the dissolved rock and the heated aqueous fluid from the borehole by an ascending fluid stream.

The invention also includes a drilling system for hydrothermally drilling a subterranean formation comprising a coiled tubing with an upper end and a lower end; a body attached to the lower end of the coiled tubing, said body having a heating chamber disposed therein and a plurality of nozzles opening through said body adjacent the bottom of the body so as to communicate with the heating chamber, said chamber capable of heating aqueous fluid, said nozzles capable of directing heated aqueous fluid to formation rock below the coiled tubing.

The invention further includes a drilling system for hydrothermally drilling a subterranean formation comprising a coiled tubing with an upper end and a lower end; a body attached to the lower end of the coiled tubing, said body having a combustion chamber disposed therein and having a first set of nozzles opening through the bottom of the body, said first set of nozzles being capable of emitting chemical reactants and products of combustion occurring in said combustion chamber and a second set of nozzles opening through the bottom of the body adjacent to the first set of nozzles, said second set of nozzles being capable of emitting a heated aqueous fluid comprising water and hydroxides of Group I elements of The Periodic Table of Elements and mixtures thereof and said first set and second set of nozzles capable of directing heated aqueous fluid to formation rock below the coiled tubing.

BRIEF DESCRIPTION OF THE DRAWINGS

The invention and its advantages will be better understood by referring to the drawings which are not necessarily to scale and in which like numerals identify like parts and in which:

FIG. 4 is an enlarged schematic representation, partly cross-sectional, of a second embodiment of a hydrothermal drilling system that uses chemical reaction to produce hot drilling fluid in a borehole.

FIG. 5 is a cross-sectional view taken along line 5—5 of FIG. 4.

FIG. 6 is a bottom view of the combustion heater illustrated in FIG. 4 showing the configuration of reactant nozzles and water nozzles.

Figure 1:
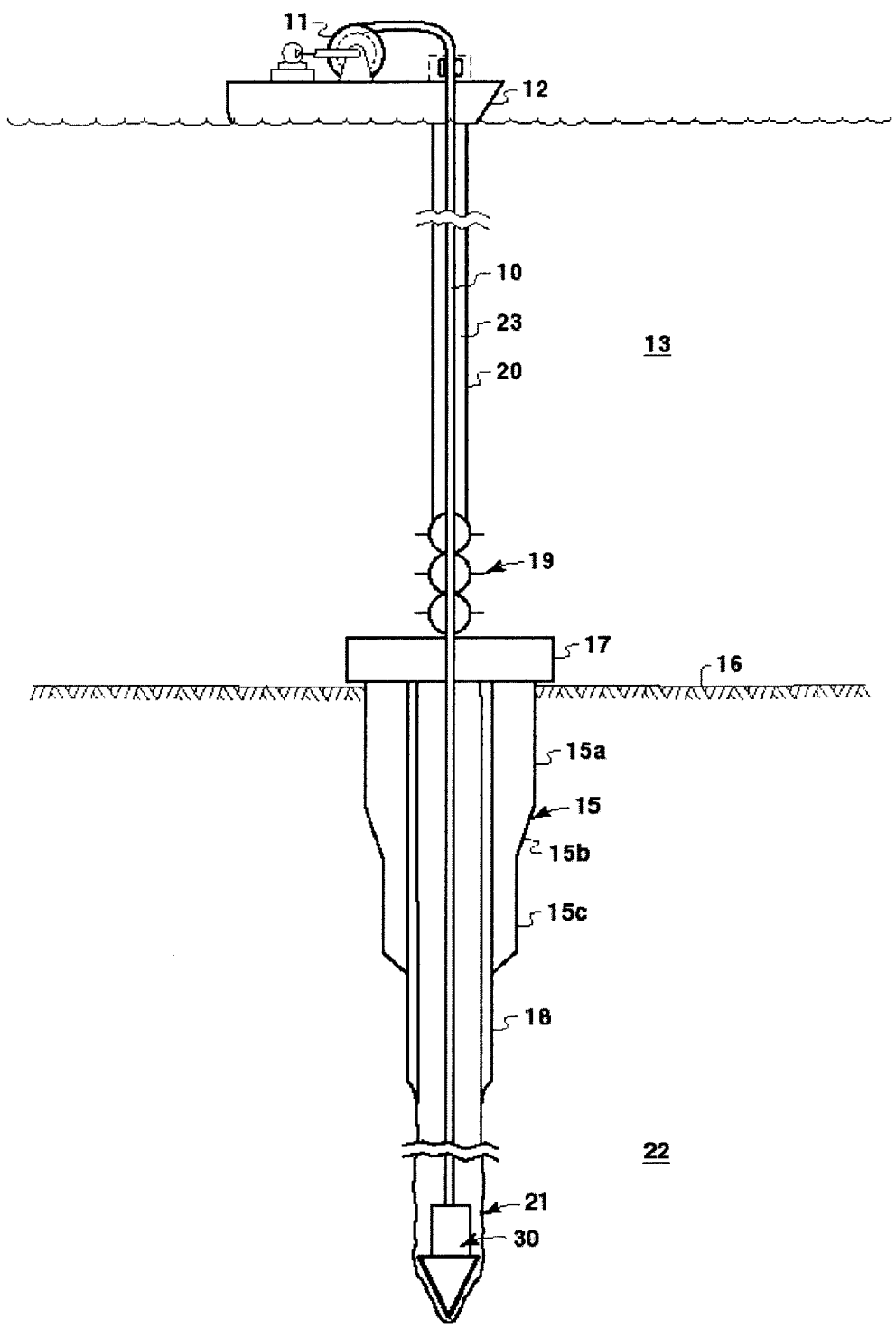
FIG. 1 is a schematic representation in elevational view of a hydrothermal drilling operation of the present invention being performed from a marine vessel.

The drawings illustrate specific embodiments of the method and system of this invention. The drawings are not intended to exclude from the scope of the invention other embodiments that are the result of normal and expected modifications of these specific embodiments.

DETAILED DESCRIPTION

In the method for drilling into and through subsurface rock formations an aqueous fluid comprising water and hydroxides of Group I elements of The Periodic Table of Elements (i.e., The Periodic Table of Elements is the Long Form of the Table as disclosed for example in "Advanced Inorganic Chemistry", Cotton and Wilkinson, John Wiley & Sons, 1962) and mixtures thereof is used. The hydroxyl ion concentration of the hydroxides of Group I elements of The Periodic Table of Elements and mixtures thereof at ambient conditions is in the range of about 0.025 to 30 moles of hydroxyl ion per kilogram of water. The upper limit of the range is determined by the solubility of the Group I hydroxide. For example, this range for sodium hydroxide is 0.1 to 52 grams per 100 grams of solution.

In order to rapidly dissolve and remove formation rock for the purposes of drilling, a fluid with high solubility for the reaction products is necessary. Concentrated aqueous solutions of hydroxides of alkali metals react with all subsurface rock formations and are capable of forming one or more water soluble complexes with at least one of Si or Al. For the aluminosilicate rocks, the high hydroxyl ion concentration in the fluid provides the dual benefits of (i) enhancing the dissolution rate by fully ionizing the chemical surface groups on the formation rock, thus maximizing the density of surface sites vulnerable to hydrolysis, and (ii) enhancing solubility of reaction products by forming thermally stable soluble complexes. Such fluids dissolve rock and consume hydroxide stochiometrically until the hydroxyl ion concentration drops to near 0.01 moles of hydroxyl ion per kilogram of water. Therefore, with high initial hydroxyl ion concentrations, these solutions can solubilize large quantities of rock, as indicated by commercially available solutions containing up to 30 weight percent dissolved silica. Preferred materials to achieve hydroxyl ion concentration above 0.01 moles of hydroxyl ion per kilogram of water are alkali metal and alkaline earth metal components such as hydroxides, silicates, carbonates, bicarbonates, mixtures thereof and the like. The most preferred, nonlimiting material is sodium hydroxide. Other solutes may be added in any desired quantity to achieve other (unstated) objectives as long as the hydroxyl ion concentration is maintained. Applicants have discovered that aqueous solutions of hydroxides of alkali metals with concentrations of at least 0.025 moles of hydroxyl ion per kilogram of water can achieve commercially viable formation penetration rates at temperatures above 500° C. For example, a rate of penetration of 12.4 ft/hr (1 mm/s) is readily achievable at 800° C.

One parameter that controls the overall penetration rate achievable with a given drilling fluid is temperature. Applicants' experiments have extended dissolution rate and activation energy measurements to temperatures, pressures, and hydroxyl ion concentrations well above data available in the literature. Applicants have discovered that the dissolution reaction rate rapidly increases with temperature beyond 500° C., despite the radical changes in the physical properties of the solution due to exceeding the critical temperature of water, even at elevated pressures at which water becomes supercritical. The increase in dissolution rate observed by the applicants follows an Arrhenius law with a high activation energy that suggests dissolution under fully ionized (high hydroxyl ion concentration) conditions (Dove, Am. J. Sci., Vol. 294, pp. 665–712 (1994)), but with an absolute rate 2 to 3 times higher than predicted from low-temperature literature data. For the purpose of this invention, heating the aqueous drilling fluid to a temperature in the range of 500° C. to 1400° C. prior to contacting rock of a subsurface formation is preferred. Heating the aqueous drilling fluid to a temperature in the range of 800° C. to 1200° C. prior to contacting rock of a subsurface formation is more preferred.

For a selected fluid composition and operating temperature, the nature of the solution is further influenced by the operating pressure. If the operating pressure is less than the vapor pressure of the initial fluid composition, the fluid will phase-separate into a low-density vapor phase consisting mainly of water and a high-density, highly-concentrated phase. The volume fractions and concentrations of the two phases depend on the exact conditions. For example, a solution of 20 weight percent sodium hydroxide is a single phase, homogeneous fluid at ambient conditions, but at 500° C. it has a vapor pressure of about 66.2 MPa as disclosed in M. A. Urusova, "Phase Equilibria in the Sodium Hydroxide-Water and Sodium Chloride-Water Systems at 350–550° C.", Russian Journal of Inorganic Chemistry, Volume 19, 1974, p 450. At a formation pressure of 48 MPa, it phase separates into a high-density fluid with a concentration of about 40 weight percent sodium hydroxide and a density of 1.14 g/cm$^3$, and a low-density vapor phase consisting of supercritical water with between 0.13 and 0.4 weight percent sodium hydroxide and a density of 0.24 g/cm$^3$. The mass ratio of the two phases is 1:1, whereas the volume ratio is 1:4.75.

At temperatures and pressures in which the drilling fluid is phase-separated, the high-density phase is propelled by the low-density phase onto the rock formation in the form of droplets. Applicants have discovered that the volumetric expansion of the fluid associated with the formation of the low-density phase, which can be as high as a factor of ten or more, provides high fluid and droplet impact velocities even for relatively low volumetric fluid flow rates at the wellhead. Furthermore, since the phase separation concentrates the active reagents in the high-density phase, relatively dilute and benign solutions can be pumped down the drill string while still obtaining highly concentrated reactive fluid at the bottom of the borehole. In this way, it is even possible to achieve reactant solubilities that exceed saturation at well-head (ambient) conditions.

Since the primary dissolution reaction for aluminosilicate rock is the hydrolysis of the rock, which consumes water and hydroxyl ions, it is necessary to maintain vigorous mixing of the fluid contacting the formation surface in order to avoid depletion of reactants and buildup of reaction products near the surface. In the current invention, this is achieved by deployment of an array of impinging jets that deliver high-velocity streams of the fluid to the active drilling surface. Jet impingement is a well-known method to achieve very large heat transfer rates primarily in cooling applications, and can simultaneously deliver the heat and reactants to the surface of the formation at a sufficient rate to maintain the dissolution reaction. This is achieved by the vigorous turbulent mixing of the fluid around the point of impingement.

The array of impinging jets provides the added benefit of controlling the direction of drilling. Exposed surfaces in the borehole that are not directly impinged by the jets have insufficient mixing for the dissolution reaction to proceed efficiently. The heat transfer rate and effective dissolution rate outside the jet impingement area drops by many orders of magnitude providing spatial selectivity that enables the formation of a well-defined borehole in the direction defined by the impinging jets. By controlling the spacing, placement, and/or activation of individual jets in an array, it is possible to dissolve the formation selectively in any desired direction.

The fluid flow rate through the jets need only be high enough to provide sufficient mixing at the formation surface to satisfy the heat and mass transfer requirements in order to maintain high dissolution rates. Preferably, the fluid flow rate is chosen so that the rate of mass transport in the area of jet impingement with the rock face is equal to the chemical reaction rate at the operating temperature. A factor of 10 above and below this preferred rate can be used but the maximum fluid flow rate in all cases is substantially less than would be required to mechanically cut the rock in order to avoid the formation of rock chips. It is preferred to introduce the aqueous fluid into the top of the drill string at a rate in the range of about 0.1 to 10 liters per minute per square centimeter of geometric area of the bottom of the borehole. Current hydro-jet drilling processes require the liquid flow discharge pressures from the down hole drilling jets to exceed at least 10,000 psig. In contrast, the projected fluid flow pressures of the current invention are less than about 250 psig. Since the drilling method of the invention does not require either a large weight on bit or a high flow rate of drilling fluid and mud, the invention enables slim-hole, coiled-tubing to deeper depths compared to conventional coiled tubing drilling systems and extended reach directional drilling.

Rock removal is not limited to dissolution only. Dissolution processes may interact with other physical processes to affect the rate of rock penetration. For example, in permeable formations, dissolution caused by the flow of fluid through the pores can cause the rock grains to disaggregate with relatively little overall dissolution. These phenomena can increase the rate of penetration provided the disaggregated material is adequately removed from the borehole.

In addition, dissolution may occur by chemical mechanisms other than those discussed above. For example, when drilling through carbonate- and sulfate-based formations, the same hot, aqueous solution with high hydroxyl ion concentration can be used. However, for such formations, the rock decomposes into an acidic gas, such as carbon dioxide or sulfur dioxide, which readily dissolves into the aqueous solution, and an insoluble precipitate. This process causes the rock to disintegrate.

The method for drilling into and through subsurface rock formations using an aqueous fluid comprising water and hydroxides of Group I elements of The Periodic Table of Elements and mixtures thereof will hereinafter be called hydrothermal drilling.

The invention also includes a system for hydrothermal drilling. The hydrothermal drilling system comprises means for providing (i) reactive fluid and (ii) heat to the bottom of a borehole being drilled. Non-limiting embodiments of the system are disclosed.

Electrical Heating of Water

Referring to FIG. 1, a hydrothermal drilling unit 30 is illustrated that is attached to the end of coiled tubing string 10 for drilling in a subterranean formation 22 under a body of water 13. Typically, the tubing string 10 is from about one to three inches (2.5 to 7.5 cm) in outside diameter, and made of steel. However, the tubing string 10 may be made of any other suitable material, including composites, and may have an outside diameter that falls outside this range. The tubing string 10 is preferably coiled on a large reel 11 onboard a floating vessel 12, and the tubing string 10 is unreeled as borehole 21 is drilled deeper. The tubing string 10 may be deployed from any suitable marine vessel, such as a mobile offshore drilling unit, a deep draft caisson vessel, a tension leg platform, or other suitable marine structure for holding the coiled tubing reel. Although not shown in the drawings, the coiled tubing reel system may alternatively be positioned on the sea floor 16, in which case the coiled tubing system would have control and power modules that are operated remotely from the water's surface. Vessel 12 has mounted on it power sources, pumps, tanks, equipment for mud cleaning (not shown) and equipment for drilling fluid reprocessing (not shown) that is circulated in the borehole, and other equipment normally associated with a drilling operation. Such drilling equipment would be familiar to persons skilled in the art.

Before commencing hydrothermal drilling, a length of a rigid casing structure 15 is placed vertically into the topmost portions of formation 22 underlying the body of water 13 to prevent the formation 22 from caving into borehole 21 as drilling proceeds and to prevent uncontrolled escape of formation fluids from borehole 21. The length and diameter of the casing structure 15 will therefore be determined by the nature and thickness of the uppermost strata of formation 22. Techniques for installing such casing are well known. The casing structure 15, as shown in FIG. 1, may have different diameters, tapering from a larger diameter at the seafloor and descending to a smaller diameter that approximates the desired diameter of the borehole to be drilled. As a nonlimiting example, the casing structure's upper end 15a may have a 9 5/8-inch (24.5 cm) outside diameter, the middle section 15b may have a 7-inch (17.8 cm) outside diameter, and the lower section 15c may have a 5-inch (12.7 cm) outside diameter.

A conventional wellhead 17 is attached to the upper end 15a of the casing structure. An inner casing 18, having substantially the same diameter as the diameter of the lower end 15c of the casing structure 15, passes through the casing structure 15 and is also connected to the wellhead 17. A blowout preventor (BOP) stack 19 is positioned above the wellhead 17 for well control purposes. The BOP stack 19 would have conventional well control lines extending to the vessel 12 that are not shown in the FIG. 1. A small diameter riser 20 extends from the BOP stack 19 for transporting fluids in the annular space 23 between tubing string 10 and riser 20. Typically, riser 20 is from about 3 to 5 inches (7.5 to 13 cm) in outside diameter and is made of steel or other high-strength material such as a composite. However, riser 20 may have an outside diameter that falls outside this range. Although not shown in FIG. 1, the drilling vessel 12 is preferably equipped with a suitable riser tensioner system for maintaining riser 20 in tension. Attached to the lower end of the tubing string 10 is a hydrothermal drilling unit 30 that is illustrated in more detail in FIG. 2.

Figure 2:
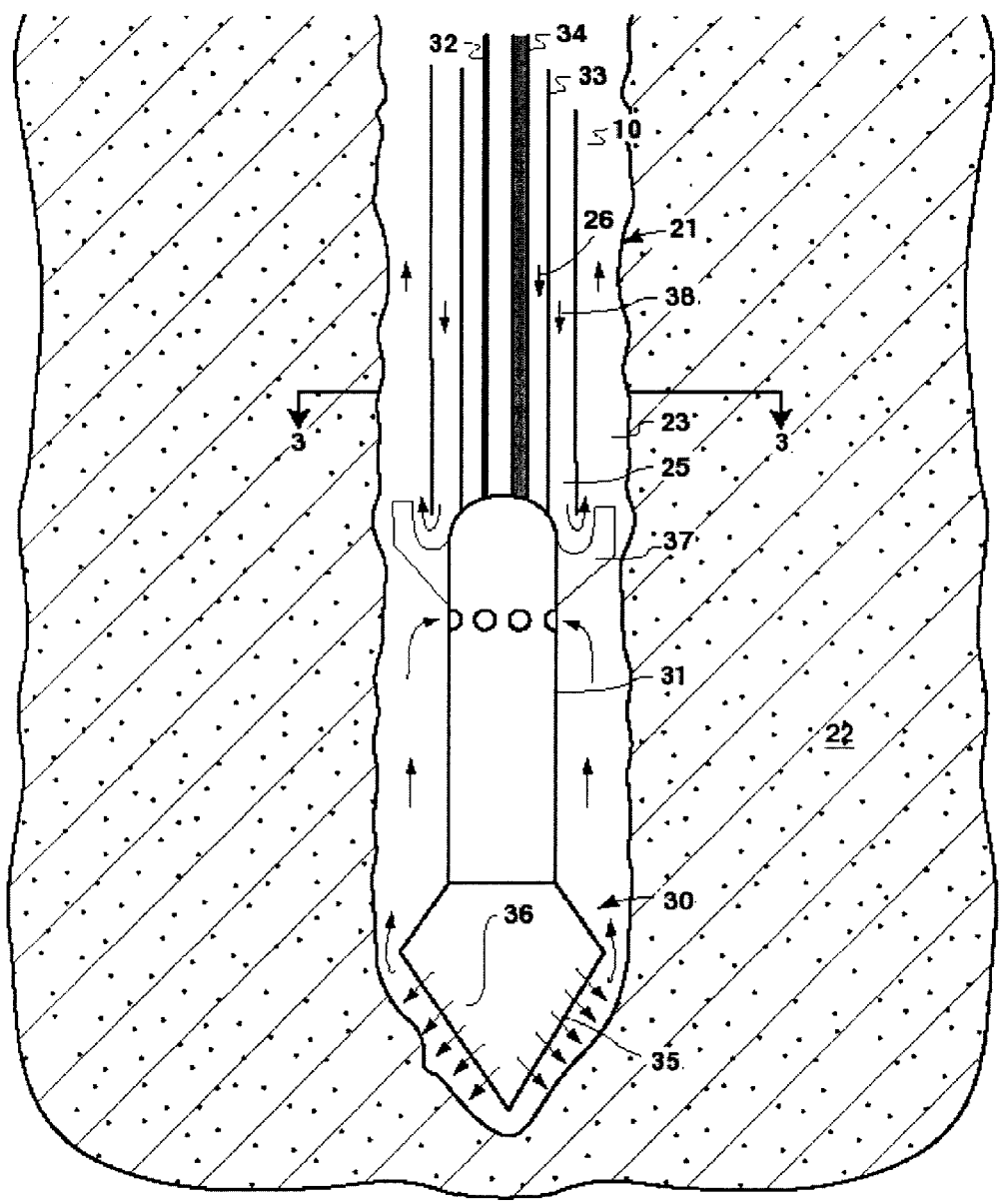
FIG. 2 is an enlarged schematic representation, partly cross sectional, of one embodiment of a hydrothermal drilling system that uses electrical energy to heat the drilling fluid.

FIG. 2 schematically illustrates one embodiment of a hydrothermal drilling unit 30 that provides hot aqueous fluid for hydrothermal drilling. Attached to the distal end of the tubing string 10 is a heater 31 for heating the fluid to the operating temperature. Heater 31 may be any suitable device for this purpose. In this embodiment, the heater 31 uses electrical energy as the power source. Heater 31 is attached to the lower end of flow conduit 33. The fluid to be heated is passed to heater 31 through flow conduit 33, the downward flow of which is shown by arrow 26. Inside conduit 33 is an insulated electrical line 32 that provides electrical energy to heater 31 from an electrical power source (not shown) onboard vessel 12. Although not shown in FIG. 1, the electrical conduit 32 may optionally be formed in the wall of conduit 33 or in the wall of tubing string 10 or placed separately inside coiled tubing 10 in the annular space 25 between the tubing string 10 and conduit 33, thereby providing additional space for fluid flow through conduit 33.

The heated single or two-phase fluid flow (represented by arrows 36) is emitted through jet nozzles (not shown) located on the surface of a conical drillbit 35 attached to the distal end of heater 31, and causes dissolution of the formation 22 that is impinged by the jets. The number, diameter and positioning of the jets and the drilling fluid return ports (not shown) are designed for optimal drilling fluid contacting with the formation 22 and to minimize cross flow using methods of fluid dynamics familiar to those skilled in the art.

If the formation 22 is sufficiently permeable, at least part of the fluid 36 may flow into the formation 22. The remainder of the drilling fluid will flow into the annular space between the heater 31 and the wall of borehole 21 below the deflecting skirt 37. The returned drilling fluid can be mixed with an aqueous circulating fluid (represented by arrows 38) flowing downwardly in annular space 25 or it can be returned to the wellhead for reprocessing through a separate return line 34 within conduit 33. Prior to mixing with the circulating fluid in annular space between tubing string 10 and the wall of borehole 21 or returning to the wellhead for reprocessing through conduit 34, the drilling fluid is preferably heat exchanged (heat exchanger not shown in the drawings) with cooler drilling fluid flowing downwardly through conduit 33. This heat exchange would lower the temperature of the drilling fluid prior to mixing with the circulating fluid and would enhance the energy efficiency of the drilling method and system of the present invention.

The aqueous circulating fluid is preferably passed downwardly is through annular space 25 between conduit 33 and tubing string 10, and up the annular space between coiled tubing string 10 and the wall of borehole 21. A deflecting skirt 37 directs the circulating fluid from a downward flow through annular space 25 to an upward flow in the annular space between tubing string 10 and the wall of borehole 21. The circulating fluid can provide cooling to the tubing string 10 and the face of the borehole 21, help maintain borehole gauge, and help control the influx of formation fluid into the borehole 21 during drilling. The circulating fluid can comprise a conventional drilling fluid (or drilling mud) commonly used in rotary drilling operations. The circulating fluid can also contain weighting agents such as barite (a finely divided barium sulfate) and other additives that may be desired for well control purposes.

Figure 3:
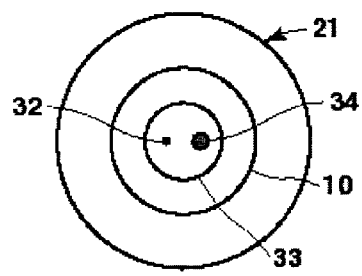
FIG. 3 is a cross-sectional view taken along line 3—3 of FIG. 2.

FIG. 3 illustrates a cross-sectional view taken along lines 3—3 of FIG. 2. The cross-section illustrates coiled tubing 10 within borehole 21, flow conduit 33 within coiled tubing 10, flow conduit 34 and electrical cable 32 within conduit 33.

Chemical Reaction to Produce Heat

FIG. 4 illustrates another embodiment of a system for delivering heat and reactants for hydrothermally drilling a well. In this embodiment, a chemical reaction creates heat and water. Two or more chemical agents are introduced into the borehole 21 and are reacted at or near the bottom of the borehole 21 to produce hot water. The chemical agents introduced can comprise substantially any chemical or combination of chemicals that exothermically react to form water. Preferred chemical agents comprise a hydrogen-supplying agent and an oxygen-supplying agent. A suitable hydrogen-supplying agent is passed through conduit 47, located inside conduit 33, to a hydrothermal mixing block 49 that is attached to the lower end of conduit 33. A nonlimiting example of a hydrogen-supplying agent is hydrogen. A suitable oxygen-supplying agent for reacting with the hydrogen-supplying agent is passed through conduit 48, also located inside conduit 33, to the mixing block 49. Nonlimiting examples of oxygen-supplying agents are oxygen and hydrogen peroxide. One advantage of using hydrogen peroxide rather than oxygen to supply all or a portion of the oxidant takes advantage of the fact that hydrogen peroxide decomposes rapidly to oxygen and water at high temperatures. The oxidant feed to the mixing block 49 is preferably in a liquid form, thereby reducing the need for a high-pressure supply conduit 48. The hydrogen-supplying and the oxygen-supplying agents are shown in FIG. 4 being fed to the mixing block 49 through small diameter flow conduits 47 and 48 inside conduit 33; however, conduits 47 and 48 may optionally be located in the annular space between conduit 33 and coiled tubing 10. Alternatively, the hydrogen-supplying or oxygen-supplying agent may be injected into the circulating fluid 38 descending in the annular space 25 as plugs of gas. The gas plugs can be compressed by the circulating fluid 38 as the gas descends to the bottom of the borehole 21. Gas separation facilities (not shown) familiar to those skilled in the art could be located near the mixing block 49 to separate the gas from the circulating fluid flow for delivery to the mixing block 49. Alternatively, at least one hydrogen-supplying agent and at least one oxygen-supplying agent may be generated at high pressure either downhole or at the surface, for example, by electrolysis either in a reactor above the mixing block 49 or within the mixing block 49. A fluid could also be decomposed downhole into separate streams of a hydrogen-supplying agent and an oxygen-supplying agent. Decomposition may be accomplished by electrolysis or by any other suitable process using electric energy transmitted through insulated electric conductors (not shown). Gas separation facilities familiar to those skilled in the art could be located near or within the mixing block 49 to separate the hydrogen supplying agent and oxygen supplying agent streams for delivery to the combustion nozzles 43 and 44.

The hydrogen-supplying agent and the oxygen-supplying agent are combined in mixing block 49 and passed through reactant nozzles 43. The combustion occurs as the reactants exit reactant nozzles 43, creating water at temperatures well above that desired for hydrothermal drilling operations. The amounts of the chemical reactants injected through reactant nozzles 43 are preferably regulated to produce the desired temperature when mixed with the cooling fluid flow exiting nozzles 44.

Cooling fluid is passed through conduit 33 (shown by arrows 50) and can comprise fresh water, formation water, brackish water, or salt water. One or more additives, including solute anions and cations or compounds to adjust or maintain pH optionally may be pre-mixed with the cooling water supply in conduit 33, or additive concentrates may be passed through conduit 34 and mixed with the cooling water downhole, or additives may be introduced directly to the superheated water produced by this embodiment. The resulting cooling fluid/additive mixture exits nozzles 44 and further mixes with and cools the heated water formed by the reactants exiting nozzles 43 to produce the heated single or two-phase fluid flow (represented by arrows 46) emitted through jet nozzles (not shown) located on the surface of a conical drillbit 35 attached to the distal end of combustion chamber 45, and causes dissolution of the formation 22 that is impinged by the jets.

The number, diameter and positioning of the jets and the drilling fluid return ports (not shown) on the conical drill bit are designed for optimal drilling fluid contacting with the formation 22 and to minimize cross flow using methods of fluid dynamics familiar to those skilled in the art.

Preferably, the temperature of the drilling fluid ranges between about 500° C. and 1400° C., and more preferably between about 800° C. and 1200° C.

One advantage of the combustion heating and reaction embodiments is that the cooling fluid passing through conduit 33 and the reactant streams passed through conduits 47 and 48 can be used to cool the combustion chamber 45 and the drill bit 35 to a temperature below that of the drilling fluid 46 exiting the jets in the conical drill bit 35.

FIG. 5 illustrates a cross-sectional view taken along lines 5—5 of FIG. 4. The cross-section illustrates coiled tubing 10 within borehole 21, flow conduit 33 within coiled tubing 10, solute conduit 34, and conduits 47 and 48 within conduit 33. FIG. 6 shows a non-limiting example of a configuration of reactant nozzles 43 and cooling water nozzles 44. In this configuration, the reactant nozzles 43 and cooling water nozzles 44 are arranged in alternating relationship. Other configurations can be used in this embodiment.

The number and designs of nozzles 43 and 44 illustrated in FIGS. 4 and 6 will depend on the desired size of the borehole, the flow rates of combustion gases through reactant nozzles 43 and the flow rate of water through water nozzles 44. Although not required for practicing this embodiment, both nozzles 43 and 44 may have flow regulators that can be controlled remotely from vessel 12 to regulate the flow rate of fluids through the nozzles as a means of controlling the maximum temperature and temperature distribution of the drilling fluid.

By means of calculations and/or tests, the compositions and flow rates of the water forming chemical agents can be adjusted to control the amount of water produced at downhole conditions. Tests can also be performed to determine for a particular formation to be drilled an operational combination of temperature of the water, hydroxyl concentration, and solute ions that would give an acceptable penetration rate through the typical rock to be encountered during the drilling operation. Such calculations and tests would be familiar to those skilled in the art in light of the teachings of this description.

Hydrostatic Head

The hydrothermal drilling method and system of this invention can be applied to any subterranean formation in which the hydrostatic head of drilling fluid in the borehole 21 produces a pressure at the bottom of the borehole that does not exceed the fracture pressure of the formation. Hydraulic fracturing occurs when the fluid pressure in a borehole is at such a pressure that the formation rock fails and typically forms a planar fracture. During the drilling operation, the pressure in the borehole is preferably at all times maintained below the formation's fracture. Traditional drilling mud systems familiar to people skilled in the art may be used to control the pressure in the borehole. Alternatively, the drilling fluid itself may be weighted by appropriate chemically inert additives to be used as the coolant and weighting fluid, simplifying the overall design of the drill string.

Drilling Direction

Although not shown in the drawings, the hydrothermal drilling systems can be provided with sensors such as gyroscopes for monitoring the orientation of the drilling system. The signals produced by these sensors can be used to selectively control flow and temperature distribution of the fluids passed through the dissolution jets and thereby control the direction in which the borehole is drilled.

Self-Casing

Precipitation of the reaction products of the present invention on and in the walls of the borehole 21 can strengthen and seal the walls against structural collapse and wellbore fluid loss thereby greatly extending time interval between casing of the borehole. Exposed surfaces in the borehole 21 that are not directly impinged by the jets and where the drilling fluid temperature remains high (e.g., in FIG. 2, below the deflecting skirt 37 and above the distal end of the heater 31) have insufficient mixing for the dissolution reaction to result in the net removal of rock. The rate of reaction remains high but the rate of rock removal from the borehole wall 21 becomes mass transport limited outside the jet impingement area. Because of the poor mixing in these regions, the concentration of reaction products at the rock fluid interface increases to their respective solubility limits. For porous formations where the borehole pressure is at least equal to the formation fluid pressure, precipitation of reaction products occurs on and in the porous rock surfaces of the borehole 21 that are not directly impinged by the jet and along high permeability paths into the formation providing partial or total self-casing of the borehole.

In some applications, however, it may be desirable to install casing. For larger diameter borehole, casing may be accomplished employing conventional telescoping casing strings using methods familiar to those skilled in the art. In the case where borehole 21 is a small diameter borehole, the slim borehole can be cased using an expandable casing string (not shown in the drawings) that is inserted into borehole 21 and then radially expanded. The casing may be made of a malleable material, and when it is placed in the borehole, it can be radially expanded against the borehole wall upon application of an internal radial load. Nonlimiting examples of expandable casing are disclosed in World Intellectual Property Organization publications WO9935368 and WO9325799.

Rock Permeability

If drilling fluid flows into permeable rock of the formation being penetrated, the resulting loss can be determined and this information can be used as an indicator of rock permeability. Suitable tracer elements can also be introduced into the drilling fluid of the hydrothermal drilling system. By measuring the concentration of tracer in the returned fluid as a function of outlet pressure, the relative permeability of the rock being penetrated can be estimated by those of ordinary skill in the art.

MWD and Logging

In the drilling of subterranean boreholes, it is frequently desirable to transmit information between the subsurface and surface locations. One particularly important technique uses a borehole telemetry system designed to sense, transmit, and receive information indicative of a subsurface condition or subsurface position. The hydrothermal drilling system disclosed in this description may include one or more downhole sensors operatively associated with the coiled tubing or the hydrothermal drilling systems. These detection systems have become known in the art as "logging while drilling" or "measurement while drilling", or simply "MWD". The electric cable 32 of FIG. 2 could also optionally include a line for transmitting a signal between the subsurface and surface locations.

During hydrothermal drilling operations, a portion of the hydrocarbons encountered in the formation being drilled may be converted to CO, $CO_2$, $CH_4$, and/or $H_2$ that may be returned to the surface with either the circulating fluid or the drilling fluid. In addition, trace elements (such as sulfur and nitrogen) in the hydrocarbon deposits may also be converted to their oxides and returned to the surface. These compounds could be detected in the returning fluids and used by persons skilled in the art as indicators of hydrocarbon facies encountered during drilling.

Experimental Data
Laboratory-Scale Hydrothermal Drilling

A high-pressure, high-temperature flow unit was used to demonstrate the invention with a single jet nozzle and gravity feed of the core onto the nozzle. Hot, pressurized mixtures of sodium hydroxide (NaOH) and water were used as drilling fluids. The unit was built from high-nickel alloys to limit corrosion. Dual syringe pumps delivered continuous flow to the unit, with pressure maintained by a back-pressure regulator. The solution was heated by flowing through a coil in a furnace. The hot solution entered the sample holder through a small tube acting as a jet nozzle. The rock core was sealed on the sides in a grafoil-gasketed metal cylinder to restrict chemical attack to the external faces. The sealed core was free to slide vertically but not horizontally inside the sample holder. The sample holder was mounted with the nozzle pointing up and the rock resting directly on the nozzle. The flowing hot fluid impinged directly on the bottom rock face, dissolving and removing rock to form a borehole. As the hole formed, gravity pushed the rock down onto the nozzle tip until the hole was drilled all the way through the rock. Completion of the hole was indicated by a sudden temperature rise past the rock. The core was examined ex-situ using computed x-ray tomography. Typical conditions were 450° C.; 38 MPa (380 bar); 0.04 weight % NaOH (single phase fluid at these conditions); nozzle of 1.6 mm outer diameter, 1 mm inner diameter, 35 mm long; 1 g/s flow exiting the nozzle at 5 m/s with a Reynolds number of 35,000. Under these conditions, a 5 mm diameter hole was drilled through a 12 mm diameter, 31 mm long Berea sandstone core in 45 minutes.

Measured rates of penetration in Berea sandstone were ~0.1 ft/hr (0.01 mm/s) at 450° C. The cores remained competent after drilling. Measured diameters of the drilled holes were 5–7 times larger than the inner diameter of the drilling nozzle. In addition, in Berea sandstone, the rock pores surrounding the hole were filled with precipitated reaction products glazing the walls of the borehole and demonstrating the concept of self casing described above.
Measurement of Dissolution Rates Measurements of the limiting rate of penetration achievable by the methods of this invention were based on measurement of the wall recession rate using a single capillary jet at a fixed distance from the surface of a rock core. A down flow geometry was used with the initial spacing between the surface of the rock core and the outlet of the capillary jet typically set equal to the inner diameter of the capillary. Fluid dynamic modeling of this dissolution geometry for a single phase fluid has shown that the rate of wall recession along the centerline of the capillary flow is proportional to the dissolution rate, and is approximately independent of the spacing for spacing up to ~6 to 10 times the capillary inner diameter. Experiments were carried out inside a cold-wall, high-temperature, high-pressure autoclave at typical borehole pressures encountered during subterranean drilling operations. Syringe pumps delivered continuous flow of the drilling fluid to the capillary inlet, at constant capillary outlet pressure using methods familiar to those in the field. The drilling fluid was heated to the same temperature as the rock core by a furnace located inside the cold-wall autoclave prior to injection into the capillary inlet. Exposure of the rock core to the capillary jet flow was carried out under isobaric conditions for varying temperatures, exposure times, fluid flow rates and drilling fluid chemical compositions. For each experiment fluid dynamic modeling of the wall recession rate for the single phase fluid was used to set the minimum capillary 10 flow rate required to avoid mass transport limitations in the measured wall recession rate. Variation of the flow rate above and below this minimum value was used to verify the independence of the measured rate on jet flow velocity under the conditions of the measurement. The shape and depth of the hole produced in the rock core by the impinging jet flow was measured using computed x-ray tomography. Single crystal cylindrical quartz cores 0.635 cm in thickness and 1.0 cm in diameter with the z-axis oriented parallel to the axis of the capillary were used as standards to quantitatively measure the dependence of the rate of dissolution on temperature, capillary flow rate, exposure time and drilling fluid chemical composition. The use of crystalline quartz avoids the natural variability in rock cores and allows collection of quantitative data that can be reliably extrapolated. Typical conditions were 397° C.; 37.5 MPa (375 bar); 0.4 weight % NaOH (single phase fluid at these conditions); nozzle inner diameter 0.406 mm, capillary length 5 mm long; 0.55 g/s flow exiting the nozzle. Under these conditions a quartz dissolution rate of $3.11 \times 10^{-2}$ moles/sq. m/s was obtained. Similar experiments were carried out under conditions where the drilling fluid is a two-phase fluid. Typical conditions were 498° C.; 37.5 MPa (375 bar); 0.4 weight % NaOH (two phase fluid under these conditions); nozzle inner diameter 0.406 mm, capillary length 5 mm long; 0.55 g/s flow exiting the nozzle. Under these conditions a quartz dissolution rate of $3.52 \times 10^{-1}$ moles/sq. m/s was observed. The quartz dissolution rate was found to be first order with an activation energy of 83.98 kJ/mole, which is consistent with a dissolution mechanism under fully surface ionized (high hydroxyl ion concentration) conditions (Dove, Am. J. Sci., Vol. 294, pp. 665–712 (1994)). However, absolute rates are enhanced 2 to 3 times relative to extrapolated low-temperature data available in the literature.

Additional experiments were carried out using typical low permeability high quartz sandstones cores in order to compare the dissolution rate for crystalline quartz with that of natural sandstones. Typical conditions to were 437° C.; 37.5 MPa (375 bar); 0.4 weight % NaOH (estimated to be two phase fluid under these conditions); nozzle inner diameter 0.406 mm, capillary length 5 mm long; 0.55 g/s flow exiting the nozzle. Under these conditions the rate of sandstone dissolution was $1.93 \times 10^{-1}$ moles/sq. m/s compared to $1.37 \times 10^{-1}$ moles/sq. m/s for crystalline quartz under the same conditions. The rate of the sandstone removal was 41% faster than crystalline quartz while the porosity of the sandstone was only ~8.3%. This result suggests that disaggregation of the sandstone grain plays a role in measured rate of wall recession in this case.

In all cases, we have observed that experiments conducted with both single-phase fluids and two-phase fluids are sufficiently well-mixed to measure the limiting rate of rock removal. These data also demonstrate that in the two-phase regime, an effective mass-transfer rate can be sustained so that the maximum rock removal rate can be achieved.

Rock Dissolution as Function of Composition

Solid rock cores (typically 8 mm diameter and 5–8 mm long) and a solution of 45 weight % NaOH in water were sealed in a gold capsule at a fluid to rock ratio of 3:1 by weight. The gold capsule was pressurized to 70 MPa (700 bar) in a cold-seal static pressure vessel. The sample was then heated to 500° C. in ~1 hour, held at temperature for 3 hours, and cooled to room temperature in ~2 hours. The NaOH solution remained a single-phase, high density fluid at all times. The gold capsule was opened and the contents were visually examined to determine the extent of chemical attack on the rock.

The ability of NaOH solutions to chemically attack a wide range of rocks typical of sedimentary basins was tested for 13 different rock types at 500° C. The rocks examined in this study included: Argillaceous shale, Arenaceous shale, Carbonaceous shale, Pierre Shale, Graywacke, Bituminous shale, Catoosa shale, Ferruginous shale, Arkose sandstone, Berea sandstone, dolomite, calcium carbonate, and siltstone. For all rocks but the siltstone, complete dissolution/disaggregation occurred. In the case of the calcareous siltstone (this is an unusual rock with nearly equal calcite and aluminosilicate content), the rock did not disaggregate, but a complete reaction occurred to a sodium-calcium-aluminosilicate.

These results suggest that the methods of this invention are widely applicable to drilling the typical range of common rock facies.

Measurement of Disaggregation During Hydrothermal Attack

The same flow apparatus described in laboratory scale hydrothermal drilling and run under the same typical conditions was used in these studies. Rock cores were prepared as described in laboratory scale hydrothermal drilling, but with the addition of a small, centered hole (~3 mm diameter) mechanically drilled all the way through the core lengthwise. The rock core was sealed as above and attached to the inlet of the sample holder with the nozzle removed such that fluid flow could only travel through the existing hole in the core. This provided a simple geometry for calculating mass transfer properties using standard fluid dynamics. The core was exposed to hot, flowing solutions for a specified time and then examined ex-situ for the amount of rock removed along the hole using computed x-ray tomography. The rock removal rate was predicted from the calculated rates of mass transfer and the measured dissolution rates for the experimental conditions. Enhancement of the measured rock removal rate over the predicted removal rate gives the contribution of disaggregation to the net rate of rock removal.

When the mass transfer rate is faster than the dissolution rate (i.e., well-mixed situations), disaggregation contributed up to about 70% of the rock removal rate in Berea sandstone at Reynolds numbers of ~7500–9000.

NaOH-Water Phase Behavior

An aqueous solution of NaOH was loaded into a static autoclave with a grafoil-gasketed pressure seal. The volume of solution was equal to the volume of pure water that would give the desired internal pressure at the operating temperature as calculated from steam tables. As experiments were done near the low concentration side of the two-phase boundary, this was a good approximation to the actual internal pressure, as confirmed by separate experiments conducted with a pressure gauge. A rod of alloy Hastelloy C-276 was positioned vertically inside the autoclave. The sealed autoclave was heated in a furnace to the desired operating temperature for several hours. The autoclave was then cooled and opened and the rod was examined for a step change in surface corrosion along the height of the rod. This step change indicated the presence of a fluid meniscus at operating conditions, and thus that the loaded composition had become a two-phase fluid. By repeating the experiment for different compositions, the composition of the one to two-phase fluid boundary was determined for a given temperature and pressure.

At 48 MPa (480 bar) and 500° C., the composition at the one to two-phase boundary is between 0.13 and 0.4 weight % NaOH.

Modeling for Extrapolation to Drilling Conditions

An estimate of operating temperature, fluid flow and power requirements for producing a borehole of given size at a desired rate of penetration was modeled based on laboratory experiments on quartz and quartz-rich formation rocks described above. Based on applicants' modeling, using a 40 wt % NaOH solution at 800° C. at pressures sufficient to keep the fluid single-phase, a 5 inch (12.7 cm) diameter hole could be drilled at a drilling rate of 12.4 ft/hr (1 mm/s). The water flow required was 746 gal/hr (47 liter/min) and the steady state power required was 172 kW in the presence of the heat exchanger, and 2.1 MW when no heat exchanger was present. Temperature largely determines the achievable rate of penetration. Increasing the temperature in the example above to 1100° C. increases the rate of penetration to 115 ft/hr (10 mm/s). However, the fluid flow rate has to be increased significantly (to 4233 gal/hr (267 liter/min)) in order to increase the mass transfer rate by the same factor as the dissolution rate. The power requirements were consequently increased to 1.08 MW (15.9 MW) in the presence (absence) of the heat exchanger.

The invention represents an advance in the art of rock piercing means. Since it uses dissolution as the primary penetration mechanism, it does not require (i) torque transmission through the drill string, (ii) increased weight on bit, or (iii) a drilling mud system that can carry large chips along with the return flow. Also, the drilling rates do not depend on the mechanical strength of the formation, such that comparable drilling rates can be achieved in hard rock formations that are particularly difficult to drill using existing drilling technologies. Because of these features, this drilling method and system is particularly useful for drilling (i) small diameter holes, (ii) very deep or extended-reach holes, and (iii) holes in hard rock formations, although it can be used under a more general set of conditions. This method can also be selectively deployed in deeper portions of a pre-existing borehole in which upper formations are drilled and completed using conventional methods. Nonlimiting applications of this method include drilling of on- and off-shore oil and gas wells, and conventional and ultra-deep geothermal wells.

A person of ordinary skill in the art, particularly one having the benefit of the teachings of this patent, will recognize many modifications and variations to the specific method and system disclosed above. For example, a variety of heating systems other than heater 31 of FIG. 2 and mixing unit 49 of FIG. 4 may be used in accordance with the present invention to heat an aqueous fluid to the desired temperature in a downhole environment. Also, methods of running electrical and fluid conduits through a jointed pipe drill string permit this system to be applied to traditional jointed pipe drilling in additional to coiled-tube drilling. As discussed above, the specifically disclosed embodiments and examples should not be used to limit or restrict the scope of the invention, which is to be determined by the claims below and their equivalents.

What is claimed is:

1. A method for penetrating rock of a subsurface formation, comprising:
   (a) lowering a fluid conduit into a borehole in the subsurface formation, the conduit having a top end and a lower end and adapted to heat and discharge from the lower end a stream of aqueous fluid;
   (b) introducing into the top end of the fluid conduit an aqueous fluid comprising water and hydroxides of Group I elements of The Periodic Table of Elements and mixtures thereof;
   (c) heating said aqueous fluid to temperatures in the range of 500° C. to 1400° C. to provide a heated aqueous fluid;
   (d) discharging from the lower end of the fluid conduit the heated aqueous fluid to contact the rock of the subsurface formation and effect dissolution of the rock therefrom; and
   (e) removing the dissolved rock and the heated aqueous fluid from the borehole by an ascending fluid stream.

2. The method of claim 1 wherein the aqueous fluid is introduced into the top end of the fluid conduit at a rate in the range of about 0.1 to 10 liters per minute per square centimeter of geometric area of the bottom of the borehole.

3. The method of claim 1 wherein the heated aqueous fluid is discharged from the lower end of the fluid conduit at a rate such that the rate of mass transport in the area where said discharging of heated aqueous fluid contacts said rock is in the range of 0.1 to 10 times the rate of dissolution of the rock.

4. The method of claim 1 wherein the aqueous fluid comprising water and hydroxides of Group I elements of The Periodic Table of Elements and mixtures thereof has hydroxyl ion concentration in the range of 0.025 to 30 moles of hydroxyl ion per kilogram of water.

5. The method of claim 4 wherein the aqueous fluid further comprises silicates, carbonates, and bicarbonates of Group I and Group II elements of The Periodic Table of Elements and mixtures thereof.

6. The method of claim 1 wherein said hydroxide of Group I elements of The Periodic Table of Elements is selected from sodium hydroxide, potassium hydroxide and mixtures thereof.

7. The method of claim 1 wherein the heated aqueous fluid is a two-phase fluid comprising a high density fluid and a low density fluid.

8. The method of claim 7 wherein the density of said high density fluid is between about 0.8 to 1.8 grams per centimeter cubed and the density of said low density fluid is between about 0.01 to 0.5 grams per centimeter cubed.

9. The method of claim 7 wherein said high density fluid comprises water in the range of about 5 to 65 wt % and hydroxides of Group I elements of The Periodic Table of Elements and mixtures thereof in the range of about 35 to 95 wt %, and, the low density fluid comprises water in the range of about 99.95 to 95 wt % and hydroxides of Group I elements of The Periodic Table of Elements and mixtures thereof in the range of about 0.05 to 5 wt %.

10. The method of claim 1 wherein said removing of the dissolved rock and heated aqueous fluid is by circulating an aqueous circulating fluid continuously through and out of the fluid conduit and against the wall of the borehole and mixing the aqueous circulating fluid with the dissolved rock and the heated aqueous fluid.

11. The method of claim 1 wherein heating the aqueous fluid is by electrical means.

12. The method of claim 1 wherein heating the aqueous fluid is by combustion of at least two chemical reactants, at least one chemical reactant selected from the group consisting of oxygen-supplying reactants and at least one selected from the group consisting of hydrogen-supplying reactants.

13. The method of claim 1 further comprising the step of progressing the fluid conduit as the dissolution of the subterranean formation increases to advance the borehole.

14. The method of claim 1 wherein the fluid conduit is coiled tubing, jointed pipe or combinations thereof.

15. The method of claim 1 further comprising the step of self-casing the borehole by precipitating onto and or into the surface of said borehole the dissolved rock obtained front step(d).

16. The method of claim 1 further comprising removing the fluid stream of step (d) from the borehole and analyzing the fluid stream for the presence of at least one compound selected from CO, $CO_2$, $CH_4$, oxides of sulfur and nitrogen and $H_2$ in the fluid stream.

17. A drilling system for hydrothermally drilling a subterranean formation comprising a coiled tubing with an upper end and a lower end; a body attached to the lower end of the coiled tubing, said body having a heating chamber disposed therein and a plurality of nozzles opening through said body adjacent the bottom of the body so as to communicate with the heating chamber, said chamber capable of heating aqueous fluid, said nozzles capable of directing heated aqueous fluid to formation rock below the coiled tubing wherein said heating chamber uses electricity as the source of heating energy and said heating chamber heats said aqueous fluid to temperatures in the range of 500° C. to 1400° C.

18. A drilling system for hydrothermally drilling a subterranean formation comprising a coiled tubing with an upper end and a lower end; a body attached to the lower end of the coiled tubing, said body having a combustion chamber disposed therein and having a first set of nozzles opening through the bottom of the body, said first set of nozzles being capable of emitting chemical reactants and products of combustion occurring in said combustion chamber and a second set of nozzles opening through the bottom of the body adjacent to the first set of nozzles, said second set of nozzles being capable of emitting a heated aqueous fluid comprising water and hydroxides of Group I elements of The Periodic Table of Elements and mixtures thereof and said first set and second set of nozzles capable of directing heated aqueous fluid to formation rock below the coiled tubing.

19. The drilling system of claim 18 wherein the combustion chamber combusts at least two chemical reactants, at least one chemical reactant selected from the group consisting of oxygen-supplying reactants and at least one selected from the group consisting of hydrogen-supplying reactants.

20. The drilling system of claim 18 wherein the combustion chamber heats aqueous fluid to temperatures in the range of 500° C. to 1400° C.

* * * * *